Patented July 13, 1937

2,086,792

UNITED STATES PATENT OFFICE 2,086,792

PROCESS OF AND COMPOSITION FOR WATERPROOFING PERMEABLE MATERIAL

Constantine F. Fabian, Brookfield, Conn., and Alexander N. Sachanen, Luxembourg, Luxembourg, assignors, by mesne assignments, to The Non-Mercuric Carrot Company, Danbury, Conn., a corporation of Connecticut No Drawing. Application March 4, 1935, Serial No. 9,292

6 Claims. (Cl. 91—68)

This invention relates to a process for waterproofing textiles, felts, leathers and other permeable materials and to waterproofing compositions adapted for such use. More particularly, the invention is directed to processes and compositions which do not materially change or detrimentally affect the desirable physical properties of the materials, such, for example, as the color and softness of felts, and their permeability to air, and which avoids imparting to such materials the property of stickiness or "tackiness" which is a characteristic of many waterproofing compositions heretofore employed.

It has been proposed to waterproof such materials as textiles and felts through the use of substances such as beeswax, paraffin, ceresin, resin, etc. This type of treatment, however, tends to effect changes in certain physical properties which are frequently undesirable for the use to which the materials are to be put. Thus, for example, textiles and felts as heretofore treated by these substances tend to assume an unnatural stiffness, losing softness, flexibility and pliability. In cases where a high concentration of these substances is used, especially in the presence of frequently used resins, these waterproofed materials become sticky or tacky. Furthermore, the use of paraffin or ceresin fails to give a tight adhesion to or absorption by the fibers of materials and felts and usually results in an uneven distribution of the waterproofing substance.

We have found that satisfactory waterproofing, with the preservation of the desirable physical properties of textiles, felts, leather or other permeable materials, can be had by treating the same with mixtures of waxes and petroleum oils dissolved in suitable organic solvents, such waxes comprising mixtures of ceresin with paraffin or with solid fatty acids of the type of stearic acid. We have also found that similar results can be had by treating such materials with the same mixtures emulsified in water.

Textiles and felts treated by these mixtures in solvents or in water emulsion are waterproof and retain their original softness, color and permeability to air, with the avoidance of the objectionable stickiness. Additionally, we have observed that in many cases, particularly with certain proportions of the said ingredients in low concentration, the surface properties of textiles and felts, such, for example, as softness and lustre, are materially improved.

While the herein described process and composition have application to a wide range of materials and arts, as one example merely, mention may be made of the useful application to waterproofing felt hats. The felt impregnated with our composition becomes waterproof without losing its permeability to air, its pliability, color or lustre, with a sensible improvement in its surface properties and quality of "feel" and with no property of stickiness or tackiness. When the hat is worn, the waterproofing assists in preventing the commonly experienced discoloration of the felt surface due to the running of the dyes under conditions of wetness, and particularly the discoloration in and about the hat band due to the penetration of moisture from within ordinarily arising from perspiration. If the hat body is waterproofed in the rough, or during the hat forming process, waterproofing also assists in preventing the bleeding or running of the dyes on the surface of the felt during subsequent hat making steps.

The sweat leather itself of the hat may be usefully waterproofed by our composition, with the result that, when the hats are stacked or nested one on top of another, there is avoided the exudation of oily matter from the leather to the felt or from the felt to the leather which is often experienced and which results in the discoloration of the felt surface of one hat which is nested within another.

While our invention is not restricted by any theory which may be advanced to account for the precise action of the ingredients employed,—the main point being that they accomplish the results herein described,—the improvement resulting from the mixture of waxes or solid fatty acids with petroleum oils, as herein described, over the prior use of such substances as waxes or the like for waterproofing, appears to be governed by the following properties of such ingredients and mixtures thereof.

Waxes and solid fatty acids, being solid and stiff substances, tend ordinarily to impart their stiffness to the treated materials, such as textiles and felts, the latter losing their natural pliability and softness. Petroleum oils, however, are miscible with melted waxes and solid fatty acids in all proportions. Such mixtures in cooling form solid, semi-solid or soft substances, depending on the concentration of the oil, and when the mixture is properly prepared and applied, need not adversely affect the softness, flexibility or pliability of the materials treated. By "concentration" of the oil is meant the weight of oil in the mixture in proportion to the weight of the wax or like substance.

On standing, however, the resultant homogeneous product ordinarily, and unless certain precautions are taken, gives off the oil in the form of drops and the so-called "sweating" process takes place. The richer the mixture is with oil, the more active becomes the sweating process, and such mixtures soon tend to become oily and tacky. Mixtures, for example, of either paraffin or solid fatty acids alone with petroleum oils in high concentration are unstable and soon undergo the sweating process, although they are usable in our process for certain purposes if the concentration of the oil is low.

On the other hand, we have found that through the use of ceresin, with paraffin or solid fatty acids, in mixture with petroleum oils, soft, plastic substances result which are very stable and do not give off the oil through sweating even though the oil concentration is high. In short, the property of binding and fixing petroleum oils in these mixtures appears to be peculiarly inherent in ceresin. Due to this property and to the stability of these mixtures, the sweating process does not take place, the mixtures remain plastic and present no stickiness even in the case of a high oil concentration.

We have further found that this property of binding and fixing the oil and yielding a homogeneous and stable product is presented by a mixture of ceresin with paraffin or solid fatty acids, even though the ceresin contained in the mixture is quite low. For example, a mixture of from 5 to 10% of ceresin and 95 to 90% of paraffin is found to bind without sweating from one to two times its weight in petroleum oil. In respect to its behavior in mixtures with petroleum oils, stearic acid appears to present properties similar to those of paraffin.

Accordingly, the relative quantities of paraffin, solid fatty acids, ceresin and petroleum oil employed by us for treating textiles, felts and other materials are varied, depending on the properties and intended use of the materials to be waterproofed.

It is to be understood, however, that our invention contemplates broadly the employment as a waterproofing composition of a mixture of paraffin or a solid fatty acid and ceresin with petroleum oil. The mixture may be used with a very low content of ceresin where the softness and the lustre of the treated materials are not important. Otherwise, as, for example, in the manufacture of felt hats or fine textiles, mixtures with a greater content of ceresin should preferably be employed.

As to petroleum oils, use is made of any highly refined petroleum oils of sufficient viscosity, as, for example, a viscosity preferably represented by not less than 200 to 300 seconds at 100° F. in Saybolt's apparatus. Mixtures containing white petroleum oils should be used for treatment of materials, such as fine textiles and felts having delicate or light colors. As to white petroleum oils, use is made of oils refined up to white color, as, for example, vaseline white oils, so-called Russian oils, etc.

These highly refined oils are very stable to the oxidizing action of air and other agents. The usual petroleum oils insufficiently refined, and especially vegetable and animal oils, are not so stable and produce chemical reactions which change the physical properties of the treated materials, such as color, lustre, etc. Oxidization in particular results in discoloration and the production of adherent gummy substances.

Paraffin, ceresin and solid acids of the type of stearic acid are usually highly refined and, like the light petroleum oils, are very stable in resisting the oxidizing action of the air.

As solvents for our waterproofing compositions we may make use of any suitable but preferably colorless organic compounds which dissolve waxes and solid fatty acids, such as gasoline, benzine, chloroform, carbon tetrachloride, etc. These solvents perform no function beyond dissolving the waxes or solid fatty acids and should be sufficiently pure and volatile as to become entirely evaporated on drying without leaving any appreciable high boiling ingredients.

The preparation of the waterproofing solution is simple and consists in merely mixing in the proportions selected the solvent, the oil and the wax or other similar substances chosen. This may be carried out with the material at ordinary temperatures, although moderate heating accelerates the preparation.

The waterproofing compositions can also be obtained in the state of water emulsion in the presence of certain emulsifying agents and at a certain pH by methods familiar to those skilled in the art.

The preparation of the emulsion is preferably carried out in special mixers, such as turbo mixers, with the use of emulsifying agents dissolved in water to facilitate the emulsion or to stabilize it. Such agents, for example, may be sodium stearate or casein and petroleum sulphonic acid. Due to the melting temperatures of waxes, the preparation of the water emulsion is preferably carried out under high temperatures, such, for example, as from 50° to 60° C.

The solution having been prepared, it may be applied to the material to be treated by any method which will insure its impregnation throughout the material. This treatment may be conveniently had by immersion of the material in the solution, or, if desired, by spraying, or by any other suitable method. In the case of the use of emulsions the fluid mixture is preferably applied heated, as, for example, under temperatures approximately 50° C.

The concentration of the solutions of the waterproofing composition employed will depend upon the method of treatment of the materials to be impregnated. When the materials to be treated are to be dipped or immersed in the waterproofing solution and are to be permitted to dry naturally, a considerably lower concentration of the ingredients should be used than when the drying of the treated materials is hastened by the use of methodes involving the forcible removal of the moisture, such as drying by the use of a centrifugal dryer. In such case, the effectiveness of the centrifugal dryer should be taken into account in determining the degree of concentration. Drying may be accelerated by the use of heat or air currents to facilitate the removal of the solvent by evaporation. The method of drying used does not require any variation in the strength of the solution, i. e., the amount of solvent employed.

The invention will be better understood by the following specific illustrative examples of various waterproofing mixtures, which may be prepared according to the principles of our invention and intended to be applied by the immersion of the material in the solution, followed by natural drying, the particular weights and volumes given being merely illustrative of the approximate proportions which are preferably used for the purposes indicated.

EXAMPLE 1

*For rough textiles and felts*

Solvent: Straight run gasoline with the end point about 150° C., or chloroform, or tetracarbonchloride.

| | | |
|---|---|---|
| A mixture of ceresin and paraffin or stearic acid_____kilograms__ | From 1 to 5 |
| Petroleum oil_____do____ | From 1 to 5 |
| Solvent _____liters__ | 100 |

EXAMPLE 2

*For fine felts*

Solvent: The same.

| | | |
|---|---|---|
| A mixture of ceresin and paraffin kilogram__ | From ¼ to 1 |
| White petroleum oil_____do____ | From ½ to 2 |
| Solvent _____liters__ | 100 |

EXAMPLE 3

*For fine felts*

Solvent: The same.

| | | |
|---|---|---|
| A mixture of ceresin and paraffin kilograms__ | From ½ to 2 |
| White petroleum oil_____do____ | From 1 to 4 |
| Solvent _____liters__ | 100 |

EXAMPLE 4

*For fine textiles and felts emulsion in water*

| | | |
|---|---|---|
| A mixture of ceresin and paraffin kilograms__ | From 1 to 3 |
| White petroleum oil_____do____ | From 1 to 6 |
| Sodium stearate _____do____ | ½ |
| Petroleum sulphonic acid___do____ | ½ |
| Water _____liters__ | 100 |

EXAMPLE 5

*For fine textiles and felts emulsion in water*

| | | |
|---|---|---|
| A mixture of ceresin and paraffin kilograms | From 1 to 3 |
| White petroleum oil_____do____ | From 1 to 6 |
| Casein _____do____ | From 2 to 4 |
| Petroleum sulphonic acid___do____ | ½ |
| Water _____liters__ | 100 |

The ceresin and paraffin or ceresin and solid fatty acid should preferably comprise from about 30 to 60% by weight of the mixture of oil and waxy substance, dependent on the fineness of the materials to be treated, the finer the material the higher the percentage of oil being permissible. As previously stated, approximately from 5 to 10% of ceresin should be present in its mixture with paraffin or solid fatty acid.

Various changes and departures from the embodiment of our waterproofing composition may be made from the proportions and the ingredients herein exemplified, all within the scope and principles of our generic invention, and it is to be understood that the matter hereinbefore set forth is submitted as illustrative and not in a limiting sense.

We claim:

1. The method of water-proofing textiles, felts, leathers, and like goods, comprising applying thereto a volatile fluid vehicle in which is dispersed a small percentage of a stable non-sweating mixture containing a viscous refined petroleum oil as one component and as another component a blend of ceresin wax in sufficient amount to prevent sweating and a relatively much larger amount of a material of the group consisting of paraffin wax and solid fatty acids.

2. The method of water-proofing textiles, felts, leathers, and like goods, comprising applying thereto a volatile fluid vehicle in which is dispersed a small percentage of a stable non-sweating mixture essentially composed of 1-2 parts of a viscous refined petroleum oil and 1 part of a blend of 5-10% of ceresin wax and 95-90% of a material of the group consisting of paraffin wax and solid fatty acids.

3. A composition adapted for use in water-proofing textiles, felts and leathers, comprised of a stable non-sweating mixture containing a viscous refined petroleum oil as one component and as another component a blend of ceresin wax in sufficient amount to prevent sweating and a relatively much larger amount of a material of the group consisting of paraffin wax and solid fatty acids, and a volatile fluid vehicle in which said mixture is dispersed in a small percentage to permit of ready application.

4. A composition adapted for use in water-proofing textiles, felts and leathers, comprised of a stable non-sweating mixture essentially composed of 1-2 parts of a viscous refined petroleum oil and 1 part of a blend of 5-10% of ceresin wax and 95-90% of a material of the group consisting of paraffin wax and solid fatty acids, and a volatile fluid vehicle in which said mixture is dispersed in a small percentage to permit of ready application.

5. The method of water-proofing textiles, felts, leathers, and like goods, comprising applying thereto a volatile fluid vehicle in which is dispersed a small percentage of a stable non-sweating mixture containing a viscous refined petroleum oil as one component and as another component, constituting about 30-60% of said mixture, a blend of sufficient ceresin wax to prevent sweating and a material of the group consisting of paraffin wax and solid fatty acids.

6. A composition adapted for use in water-proofing textiles, felts and leathers, comprised of a stable non-sweating mixture containing a viscous refined petroleum oil as one component and as another component, constituting about 30-60% of said mixture, a blend of sufficient ceresin wax to prevent sweating and a material of the group consisting of paraffin wax and solid fatty acids, and a volatile fluid vehicle in which said mixture is dispersed in a small percentage to permit of ready application.

CONSTANTINE F. FABIAN.
ALEXANDER N. SACHANEN.